(12) United States Patent
Kakura

(10) Patent No.: US 6,704,373 B1
(45) Date of Patent: Mar. 9, 2004

(54) TIMING RECOVERY CIRCUIT AND METHOD IN AUTOMATIC EQUALIZER

(76) Inventor: Yoshikazu Kakura, c/o NEC Corporation, 7-1, Shiba 5-chome, Minato-ku, Tokyo (JP)

( * ) Notice: Subject to any disclaimer, the term of this patent is extended or adjusted under 35 U.S.C. 154(b) by 705 days.

(21) Appl. No.: 09/611,484

(22) Filed: Jul. 7, 2000

(30) Foreign Application Priority Data

Jul. 7, 1999 (JP) .......................................... 11/192468

(51) Int. Cl.$^7$ .............................................. H04L 27/14
(52) U.S. Cl. ........................ 375/324; 375/230; 375/354
(58) Field of Search ................................ 375/229, 230, 375/232, 233, 316, 324, 326, 354, 355; 370/350; 708/300, 301, 322, 323

(56) References Cited

U.S. PATENT DOCUMENTS

| | | | | |
|---|---|---|---|---|
| 5,537,419 A | * | 7/1996 | Parr et al. .................... | 370/350 |
| 5,809,086 A | * | 9/1998 | Ariyavisitakul ............. | 375/332 |
| 6,314,133 B1 | * | 11/2001 | Kakura et al. ............... | 375/230 |
| 6,366,612 B1 | * | 4/2002 | Kakura et al. ............... | 375/230 |
| 6,414,990 B1 | * | 7/2002 | Jonsson et al. ............. | 375/232 |

OTHER PUBLICATIONS

S. Ariyavisitakul, et al., "Reduced–Complexity Equalization Techniques for Broadband Wireless Channels", IEEE Journal on Selected Areas in Communications, vol. 15, No. 1, Jan. 1997, pp. 5–15.

* cited by examiner

Primary Examiner—Chieh M. Fan
(74) Attorney, Agent, or Firm—Dickstein, Shapiro, Morin & Oshinsky, LLP.

(57) ABSTRACT

By using the maximum one of the obtained signals as maximum absolute response value signal and m sequential absolute response value signals, in which the maximum absolute response value signal is highest in response speed, as precursor candidate signal set, an absolute value signal sum as the total sum of the precursor candidate signal set is obtained. When a weighted absolute value signal sum obtained by multiplying the absolute weighted value signal sum by a shift factor determined on the basis of the received signal intensity is greater than all of preceding absolute response value signals as absolute response value signals higher in response speed than the precursor candidate signal set, n impulse response signals next in response speed to, the precursor response signal set are made to be a postcursor response signal set.

12 Claims, 4 Drawing Sheets

TIMING RECOVERY CIRCUIT AND METHOD IN AUTOMATIC EQUALIZER

BACKGROUND OF THE INVENTION

The present invention relates to a timing recovery circuit in an automatic equalizer or the like and a timing recovery method in the same. More particularly, the present invention concerns a timing recovery performed in an automatic equalizer, in which code decision is performed by sequence estimation.

Among the automatic equalizers in which code decision is performed by system estimation, is one of DDFSE (Delayed Decision Feedback Sequence Estimation) type. As a prior art DDFSE timing recovery method is one, in which a timing is selected such as to correspond to a maximum value of an evaluation function which is used for precursor component estimation and constituted by a division of total impulse response power level as numerator by truncation error, i.e., sum of the total impulse response power level and thermal noise power level, as denominator.

Figure 4:
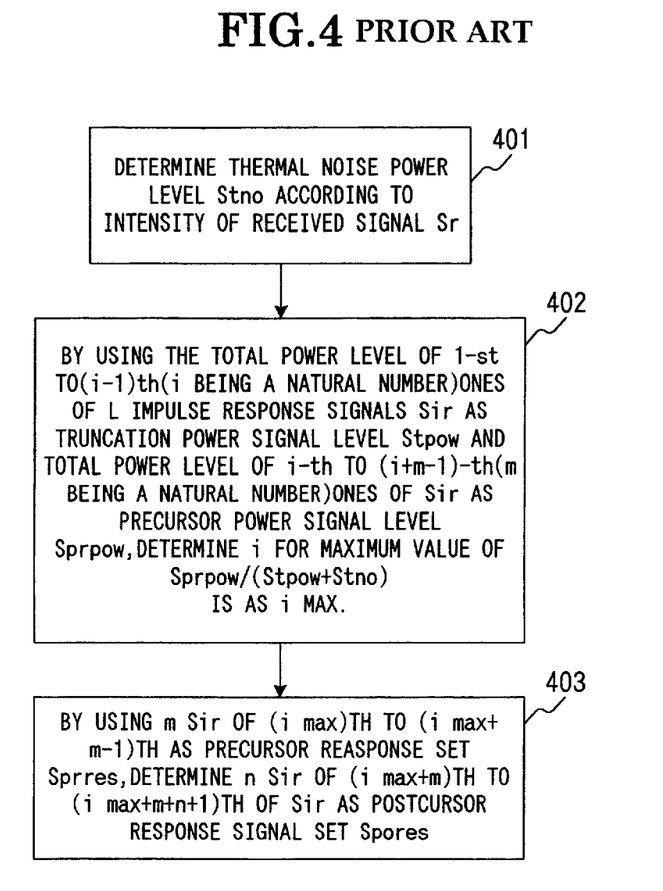
FIG. 4 is a flow chart representing the prior art timing recovery method.

A timing recovery method which is described in IEEE Journal of Selected Areas in Communications, vol. 15, pp. 5–15, January, 1997, will now be described with reference to FIG. 4. In this method, thermal noise power level $S_{tno}$ is first determined according to the intensity of received signal $S_r$ (Step 401). Then, by using the total power level of 1-st to (i−1)-th (i being a natural number) ones of L impulse response signals $S_{ir}$ as truncation power signal level $S_{tpow}$ and the total Power level of i-th to (i+m−1)-th (m being a natural number) ones of $S_{ir}$ as precursor power signal level $S_{prpow}$, a value of that corresponds to the maximum value of $$S_{prpow}/(S_{tpow}+S_{tno})$$

is determined and set as i max. (step 402).

Then, by using m, i.e., $i_{max}$.-th to ($i_{max}$.+m−1)-th, ones of $S_{ir}$ as precursor response set $S_{prres}$, n, i.e., $i_{max}$.-th to ($i_{max}$.+m+n−1)-th, ones of $S_{ir}$ are set as postcursor response signal set $S_{pores}$ (step 403). In this way, the timing recovery is executed.

The above timing recovery circuit, however, has a drawback that it is necessary to perform computations concerning the evaluation function including the division as noted above for each timing.

SUMMARY OF THE INVENTION

The present invention was made in order to overcome the above drawback, and its object is to provide timing recovery circuit in an automatic equalizer and a timing recovery method in the same, which are free from computations concerning any evaluation function.

According to a first aspect of the present invention, there is provided a timing recovery circuit comprising: absolute response value signal generating means for obtaining the absolute values of L input impulse response value signals representing as communication channel characteristic and arranged in the order of shorter response times and providing the obtained absolute values as absolute response value signals; absolute value signal sum generating means for using the maximum one of the absolute response value signals as the maximum absolute response value signal and m sequential absolute response value signals, in which the maximum absolute response value signal is highest in response speed, as a precursor candidate signal set and providing the total sum of the precursor candidate signal set as an absolute value signal sum; weighted absolute value signal sum generating means for multiplying the absolute value signal sum by a shift factor determined on the basis of the received signal intensity to obtain and provide a weighted absolute value signal sum; precursor/postcursor response signal set generating means for providing, when the weighted signal sum is greater than all of preceding absolute response value signals as the absolute response value signals higher in response speed than the precursor candidate signal set, m impulse response signals corresponding to the precursor candidate signal set among the L impulse response signals as a precursor response set and n impulse response signals next in response speed to the precursor response set as a postcursor response signal set; and weighted absolute value signal sum updating means for updating, when the weighted signal sum is less than any one of the preceding absolute value response signal sum, the precursor candidate signal set with m sequential absolute response value signals higher in response speed by one each and the weighted absolute value signal sum with the total sum of the updated precursor candidate signal set, the precursor and postcursor response signal sets being determined recursively.

According to a second aspect of the present invention, there is provided a timing recovery circuit comprising: absolute response value signal generating means for obtaining the absolute values of L input impulse response value signals representing as communication channel characteristic and arranged in the order of shorter response times and providing the obtained absolute values as absolute response value signals; truncation error signal generating means for using the maximum one of the absolute response value signals as the maximum absolute response value signal and m sequential absolute response value signals, in which the maximum absolute response value signal is highest in response speed, as a precursor candidate signal set, providing the total sum of the precursor candidate signal set as an absolute value signal sum and providing the total sum of the all the absolute response value signals higher in response speed than the maximum absolute response value signal as a truncation error signal; weighted absolute value signal sum generating means for multiplying the absolute value signal sum by a shift factor determined on the basis of the received signal intensity to obtain and provide a weighted absolute value signal sum; precursor/postcursor response signal set generating means for providing, when the weighted signal sum is greater than the truncation error signal, m impulse response signals corresponding to the precursor candidate signal set among the L impulse response signals as a precursor response set and n impulse response signals next in response speed to the precursor response set as a postcursor response signal set; and truncation error signal updating means for updating, when the weighted signal sum is less than the truncation error signal, the precursor candidate signal set with the m sequential absolute response value signals higher in response speed by one each, the weighted absolute value signal sum with the total sum of the updated precursor candidate signal set and the truncation error signal with the total sum of the all the absolute response value signals higher in response speed than the updated precursor candidate signals, the precursor and postcursor response sets being determined recursively.

According to a third aspect of the present invention, there is provided a timing recovery circuit comprising: absolute response value signal generating means for obtaining the absolute values of L input impulse response value signals representing as communication channel characteristic and arranged in the order of shorter response times and providing the obtained absolute values as absolute response value signals; precursor candidate signal generating means for using the maximum one of the absolute response value signals as the maximum absolute response value signal and m sequential absolute response value signals, in which the maximum absolute response value signal is highest in response speed, as a precursor candidate signal set; weighted absolute value signal generating means for multiplying the maximum absolute response value signal by a shift factor determined on the basis of the received signal intensity to obtain and provide a weighted absolute value signal; precursor/postcursor response value signal set generating means for providing, when the weighted signal is greater than all of preceding absolute response value signals as the absolute response value signals higher in response speed than the precursor candidate signal set, m impulse response value signals corresponding to the precursor candidate signal set among the L impulse response signals as a precursor response set and n impulse response signals next in response speed to the precursor response signal set as a postcursor response signal set; and maximum response value signal updating means for updating, when the weighted signal is less than any one of the preceding absolute response value signals, the precursor candidate signal set with m sequential absolute response value signals, in which the lowest response speed one of the preceding absolute value response signals greater than the weighted absolute value signal is highest in response speed and the maximum response value signal with the maximum one of the updated precursor candidate signal set, the precursor and postcursor response signal sets being determined recursively.

The timing recovery circuit further comprises shift factor determining means for selecting and determining the shift factor from a detected reception power level of received signal received as input.

According to a fourth aspect of the present invention, there is provided a timing recovery method comprising steps of: obtaining the absolute values of L input impulse response value signals representing as communication channel characteristic and arranged in the order of shorter response times and providing the obtained absolute values as absolute response value signals; using the maximum one of the absolute response value signals as the maximum absolute response value signal and m sequential absolute response value signals, in which the maximum absolute response value signal is highest in response speed, as a precursor candidate signal set and providing the total sum of the precursor candidate signal set as an absolute value signal sum; multiplying the absolute value signal sum by a shift factor determined on the basis of the received signal intensity to obtain and provide a weighted absolute value signal sum; providing, when the weighted signal sum is greater than all of preceding absolute response value signals as the absolute response value signals higher in response speed than the precursor candidate signal set, m impulse response signals corresponding to the precursor candidate signal set among the L impulse response signals as a precursor response set and n impulse response signals next in response speed to the precursor response set as a postcursor response signal set; and updating, when the weighted signal sum is less than any one of the preceding absolute value response signal sum, the precursor candidate signal set with m sequential absolute response value signals higher in response speed by one each and the weighted absolute value signal sum with the total sum of the updated precursor candidate signal set, the precursor and postcursor response signal sets being determined recursively.

According to a fifth aspect of the present invention, there is provided a timing recovery method comprising steps of: obtaining the absolute values of L input impulse response value signals representing as communication channel characteristic and arranged in the order of shorter response times and providing the obtained absolute values as absolute response value signals; using the maximum one of the absolute response value signals as the maximum absolute response value signal and m sequential absolute response value signals, in which the maximum absolute response value signal is highest in response speed, as a precursor candidate signal set, providing the total sum of the precursor candidate signal set as an absolute value signal sum and providing the total sum of the all the absolute response value signals higher in response speed than the maximum absolute response value signal as a truncation error signal; multiplying the absolute value signal sum by a shift factor determined on the basis of the received signal intensity to obtain and provide a weighted absolute value signal sum; providing, when the weighted absolute value signal sum is greater than the truncation error signal, m impulse response signals corresponding to the precursor candidate signal set among the L impulse response signals as a precursor response set and n impulse response signals next in response speed to the precursor response set as a postcursor response signal set; and updating, when the weighted signal sum is less than the truncation error signal, the precursor candidate signal set with the m sequential absolute response value signals higher in response speed by one each, the weighted absolute value signal sum with the total sum of the updated precursor candidate signal set and the truncation error signal with the total sum of the all the absolute response value signals higher in response speed than the updated precursor candidate signals, the precursor and postcursor response sets being determined recursively.

According to a sixth aspect of the present invention, there is provided a timing recovery method comprising steps of: obtaining the absolute values of L input impulse response value signals representing as communication channel characteristic and arranged in the order of shorter response times and providing the obtained absolute values as absolute response value signals; using the maximum one of the absolute response value signals as the maximum absolute response value signal and m sequential absolute response value signals, in which the maximum absolute response value signal is highest in response speed, as a precursor candidate signal set; and multiplying the maximum absolute response value signal by a shift factor determined on the basis of the received signal intensity to obtain and provide a weighted absolute value signal; providing, when the weighted signal is greater than all of preceding absolute response value signals as the absolute response value signals higher in response speed than the precursor candidate signal set, m impulse response value signals corresponding to the precursor candidate signal set among the L impulse response signals as a precursor response set and n impulse response signals next in response speed to the precursor response signal set as a postcursor response signal set; and updating, when the weighted signal is less than any one of the preceding absolute response value signals, the precursor candidate signal set with m sequential absolute response value signals, in which the lowest response speed one of the preceding absolute value response signals greater than the weighted absolute value signal is highest in response speed and the maximum response value signal with the maximum one of the updated precursor candidate signal set, the precursor and postcursor response signal sets being determined recursively.

The timing recovery method further comprises step for selecting and determining the shift factor from a detected reception power level of received signal received as input.

With the above construction according to the present invention, the timing recovery is executed recursively such that the product of multiplication of the total sum of the absolute values of all impulse responses as signal components by the weight factor as shift factor is greater than the absolute values of impulse responses as noise components.

Other objects and features will be clarified from the following description with reference to attached drawings.

PREFERRED EMBODIMENTS OF THE INVENTION

Preferred embodiments of the present invention will now be described with reference to the drawings.

Figure 1:
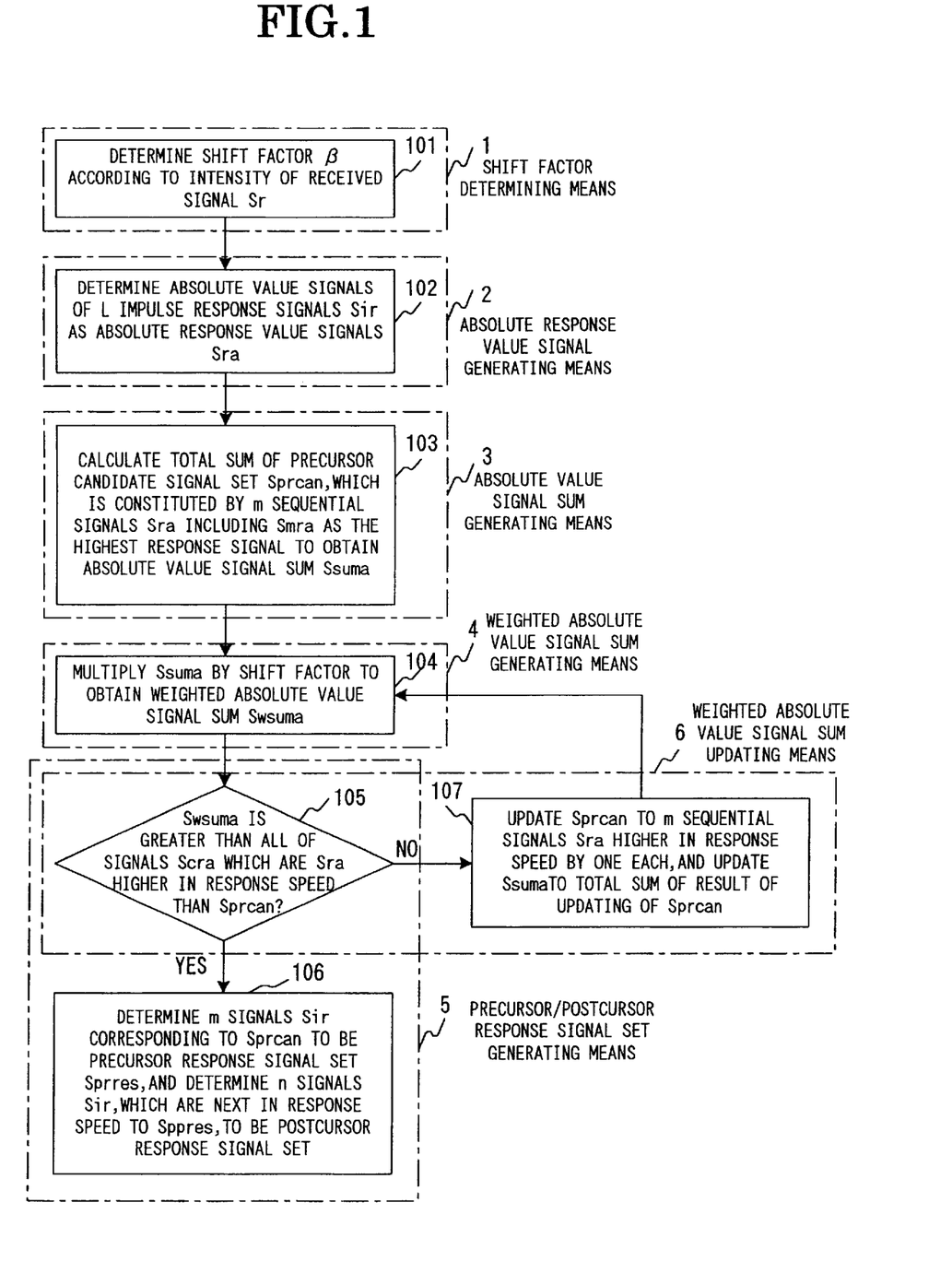
FIG. 1 is a functional block diagram showing a first embodiment of the present invention and also serves as a flow chart illustrating the operation of the embodiment.

FIG. 1 is a functional block diagram showing a first embodiment of the present invention and also serves as a flow chart illustrating the operation of the embodiment. First, shift factor determining means 1 determines shift factor $\beta$ (also called weight factor) according to the intensity of received signal $S_r$ (step 101).

The shift factor $\beta$ is set to a large value in order that the lower the received signal intensity shift is produced the less possibly. To this end, storing means such as ROM, in which shift factors corresponding to received signal intensities are stored, is provided, and when a received signal intensity is detected, a shift factor corresponding to the detected received signal intensity is read out from the storing means. The shift factor $\beta$ is made the less the higher the received signal intensity, such as 0.7, 0.6 and 0.5 for received signal intensity of below 1 mW, 1 to 5 mW and above 5 mW, respectively. To simplify the hardware, it is also possible to set a constant shift factor independent of the received signal intensity.

Subsequently, absolute response value signal generating means 2 determines the absolute value signals of L (L being a natural number) impulse response signals $S_{ir}$ as absolute response value signals $S_{ra}$ (step 102). Then, denoting the maximum absolute response value signal among $S_{ra}$ by $S_{mra}$, absolute value signal sum generating means 3 calculates the total sum of precursor candidate signal set $S_{prcan}$, which is constituted by m sequential signals $S_{ra}$ including $S_{mra}$ as the highest response signal to obtain absolute value signal sum $S_{suma}$ (step 103).

Then, weighted absolute value signal sum generating means 4 multiplies $S_{suma}$ by the shift factor (or weight factor) $\beta$ determined in the step 101 to obtain weighted absolute value signal sum $S_{wsuma}$ (step 104). When $S_{wsuma}$ is greater than all of signals $S_{era}$ which are $S_{ra}$ higher in response speed than $S_{prcan}$ (step 105), precursor/postcursor response signal set generating means 5 determines m signals $S_{ir}$ corresponding to $S_{prcan}$ to be precursor response signal set $S_{prres}$, and determines n signals $S_{ir}$, which are next in response speed to $S_{prres}$, to be postcursor response signal set (step 106).

When it is found in the step 105 that $S_{wsuma}$ is less than any one of the signals $S_{era}$, weighted absolute value signal sum updating means 6 updates $S_{prcan}$ to m sequential signals $S_{ra}$ higher in response speed by one each, and updates $S_{suma}$ to the total sum of the result of updating of $S_{prcan}$ (step 107). By recursively executing the above sequence of operations, the timing recovery is realized.

Figure 5:
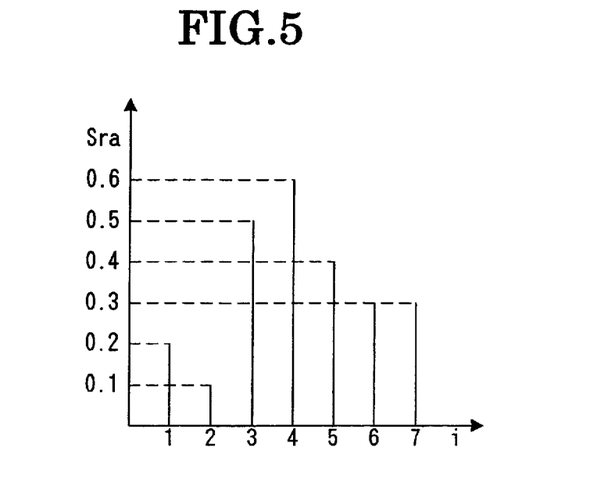
FIG. 5 is a drawing showing an example of the impulse response.

As an example, timing recovery in the case where the absolute impulse response values as shown in FIG. 5 will now be considered. It is assumed that the number of the members in the precursor response signal set is m=2, the number of the members in the postcursor set is n=2 and the shift factor $\beta$ is=0.25. Since $S_{ra}(4)=0.6$ is maximum, the maximum absolute response value signal $S_{mra}$ is $S_{mra}=0.6$. The precursor candidate signal group $S_{prcan}$ is thus $$S_{prcan}=\{S_{ra}(4), S_{ra}(5)\}=\{0.6, 0.4\}$$

Thus, the absolute value signal sum $S_{suma}$ is $$S_{suma}=S_{ra}(4)+S_{ra}(5)=1.0,$$

and the weighted absolute value signal sum $S_{wsuma}$ is $$S_{wsuma}=S_{suma}\times\beta=0.25.$$

The weighted absolute value signal sum $S_{wsuma}$ is less than $S_{ra}(3)$ which is higher in response speed than the precursor candidate signal set $S_{prcan}$. The precursor candidate signal set $S_{prcan}$ is thus less than $S_{ra}(3)$ which is higher in response speed than the precursor candidate signal set $S_{prcan}$. Thus, the precursor candidate signal set $S_{prcan}$ is updated to m sequential signals $S_{ra}$ higher in response speed by one each, that is, the updated precursor candiate set $S_{prcan}$ is $$S_{prcan}=\{S_{ra}(3), S_{ra}(4)\}=\{0.5, 0.6\}$$

and the absolute value signal sum Ssuma is also updated to $$S_{suma}=S_{ra}(3)+S_{ra}(4)=1.1.$$

Thus, the weighted absolute value signal sum $S_{wsuma}$ is $$S_{wsuma}=S_{suma}\times\beta=0.275$$

which is greater than all of the absolute response value signals $S_{ra}$ higher in response speed than the porecursor signal candidate set $S_{prcan}$.

In this way, the impulse response signals corresponding to the precursor candidate signal set $S_{prcan}$ are determined to be the precursor response signal set $S_{prcan}$, and the impulse response signals corresponding to the two absolute response value signals $S_{ra}(5)$ and $S_{ra}(6)$ next in response speed to the precursor signal candiate set $S_{prcan}$ are determined to be the postcursor response signal set $S_{pores}$.

Figure 2:
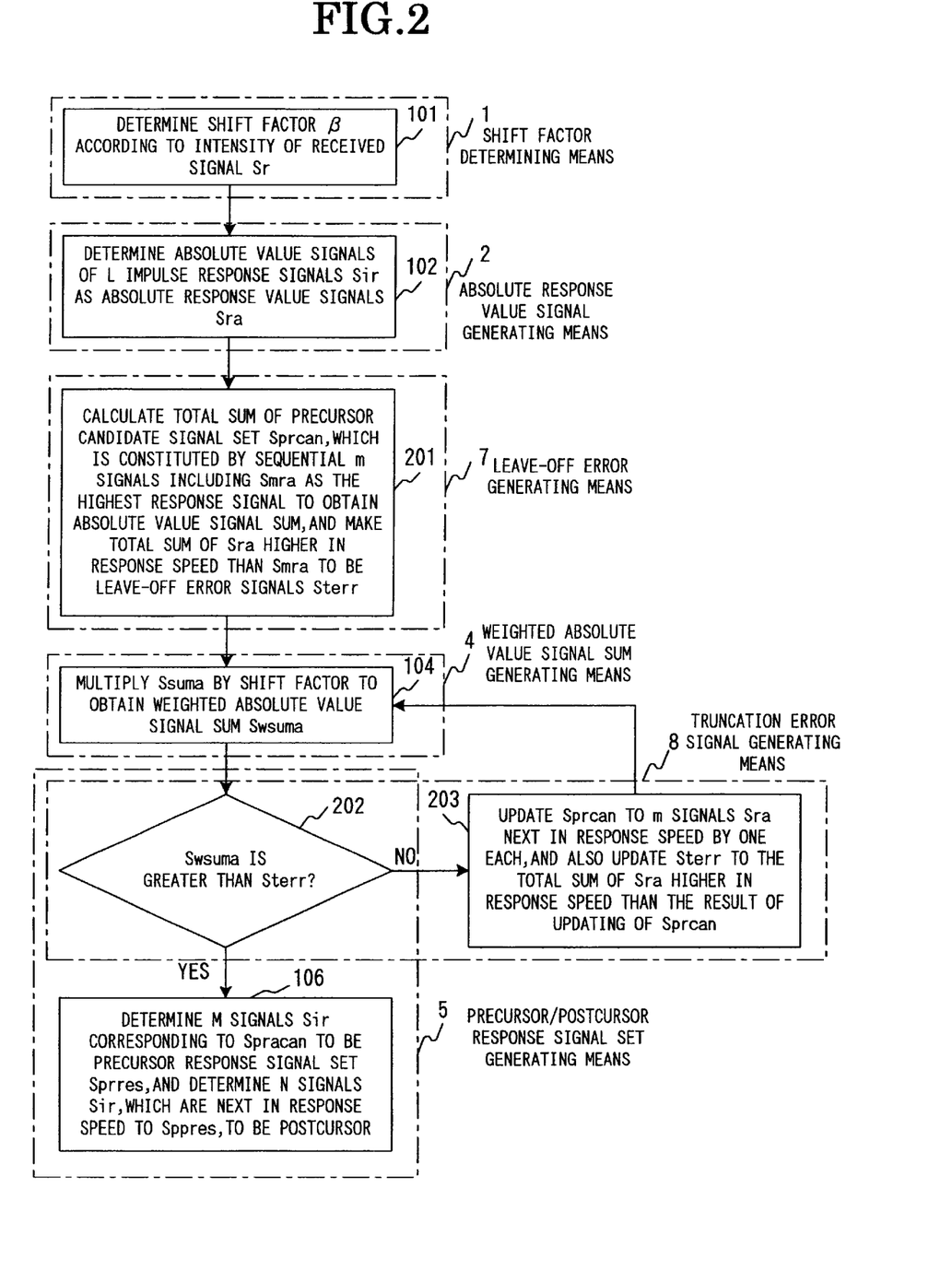
FIG. 2 is a functional block diagram showing a second embodiment of the present invention and also serves as a flow chart illustrating the operation of the embodiment.

FIG. 2 is a functional block diagram showing a second embodiment of the present invention and also serves as a flow chart illustrating the operation of the embodiment. Parts like those in FIG. 1 are designated by like reference numerals. First, the shift factor determining means 1 determines the shift factor (or weight factor) $\beta$ according to the intensity of the received signal $S_r$ (step 101). Then, the absolute response value signal generating means 2 determines the absolute value signals of L impulse response signals $S_{ir}$ as absolute response value signals $S_{ra}$ (step 102).

Then, denoting the maximum absolute response value signal among $S_{ra}$ by $S_{mra}$, truncation error generating means 7 calculates the total sum of precursor candidate signal set $S_{prcan}$, which is constituted by sequential m signals including $S_{mra}$ as the highest response signal to obtain absolute value sum signal $S_{suma}$, and makes the total sum of $S_{ra}$ higher in response speed than $S_{mra}$ to be truncation error signals $S_{terr}$ (step 201).

Then, the weighted absolute value signal sum generating means 4 multiplies $S_{suma}$ by the shift factor (or weight factor) $\beta$ to obtain weighted absolute value signal sum $S_{wsuma}$ (step 104). When $S_{wsuma}$ is greater than $S_{terr}$ (step 202), the precursor/postcursor response signal set generating means 5 determines m signals $S_{ir}$ corresponding to $S_{prcan}$ to be precursor response signal set $S_{prres}$ and also determines n signals $S_{ir}$, which are next in response speed to $S_{prres}$, to be post cursor response set (step 106).

When $S_{wsuma}$ is less than $S_{terr}$ (step 202), truncation error signal generating means 8 updates $S_{prcan}$ to m signals $S_{ra}$ next in response speed by one each, and also updates $S_{terr}$ to the total sum of $S_{ra}$ higher in response speed than the result of updating of $S_{prcan}$ (step 203). By recursively executing the above sequence operations, the timing recovery is realized.

As an example, timing recovery in the case where the absolute impulse response values are as shown in FIG. 5 will now be described. It is assumed that the number of the members in the precursor response signal set is m=2, the number of the members in the postcursor set is n=2 and the shift factor $\beta$ is $\beta$=0.5. Since $S_{ra}(4)$=0.6 is maximum, the maximum absolute response value signal $S_{mra}$ is $S_{mra}$=0.6. The precursor signal candidate group $S_{prcan}$ is thus $$S_{prcan}=\{S_{ra}(4), S_{ra}(5)\}=\{0.6, 0.4\}$$

Thus, the absolute value signal sum $S_{suma}$ is $$S_{suma}=S_{ra}(4)+S_{ra}(5)=1.0,$$

and the weighted absolute value signal sum $S_{wsuma}$ is $$S_{wsuma}=S_{suma}\times\beta=0.5.$$

Also, the truncation error signal $S_{terr}$ is $$S_{terr}=S_{ra}(1)+S_{ra}(2)+S_{ra}(3)=0.8,$$

and the weighted absolute value signal sum $S_{wsuma}$ is less than the truncation error signal $S_{terr}$. Thus, the precursor candidate signal set $S_{prcan}$ is updated to m sequential signals $S_{ra}$ higher in response speed by one each, that is, the updated precursor candidate signal set $S_{prcan}$ is $$S_{prcan}=\{S_{ra}(3), S_{ra}(4)\}=\{0.5, 0.6\},$$

and the absolute value signal sum $S_{suma}$ is also updated to $$S_{suma}=S_{ra}(3)+S_{ra}(4)=1.1.$$

Thus, the weighted absolute value signal sum $S_{wsuma}$ is $$S_{wsuma}=S_{suma}\times\beta=0.55.$$

At this time, the truncation error signal $S_{terr}$ is udated to $$S_{terr}=S_{ra}(1)+S_{ra}(2)=0.3.$$

that is, the weighted absolute value signal sum $S_{wsuma}$ becomes greater than the truncation error signal $S_{terr}$.

In this way, the impulse response signals corresponding to the precursor candidate signal set $S_{prcan}$ are determined to be the precursor response signal set $S_{prres}$, and the impulse response signals corresponding to the two absolute response signal value $S_{ra}$ (5) and $S_{ra}$ (6) next in response speed to the precursor candidate signal set $S_{prcan}$ are determined to be the postcursor response signal set $S_{pores}$.

Figure 3:
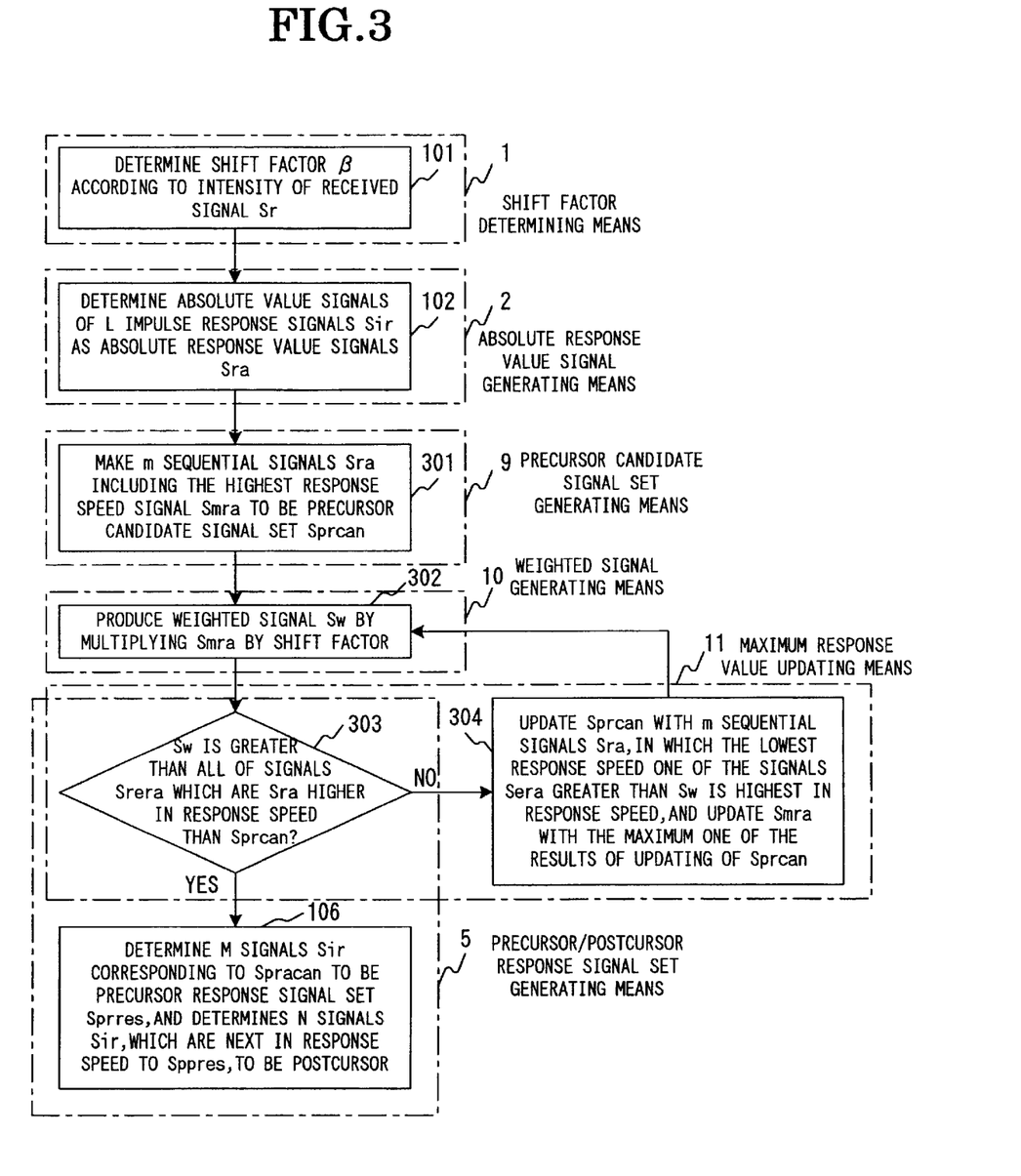
FIG. 3 is a functional block diagram showing a third embodiment of the present invention and also serves as a flow chart illustrating the operation of the embodiment.

FIG. 3 is a functional block diagram showing a third embodiment of the present invention and also serves as a flow chart illustrating the operation of the embodiment. Parts like those in FIGS. 1 and 2 are designated by like reference numerals. First, the shift factor determining means 1 determines the shift factor $\beta$ (or weight factor) according to the intensity of the received signal $S_r$ (step 101). Then, the absolute response value signal generating means 2 determines the absolute value signals of impulse response signals $S_{ir}$ as absolute response value signals $S_{ra}$ (step 102).

Then, denoting the maximum absolute response value signal among $S_{ra}$ by $S_{mra}$, precursor candidate signal set generating means 9 makes m sequential signals $S_{ra}$ including the highest response speed signal $S_{mra}$ to be precursor candidate signal set $S_{prcan}$ (step 301). Weighted signal generating means 10 produces weighted signal $S_w$ by multiplying $S_{mra}$ by shift factor $\beta$ (step 302).

When $S_w$ is greater than any of the signals $S_{era}$ which are $S_{ra}$ higher in response speed than $S_{prcan}$ (step 303), precursor/postcursor response signal set generating means 5 determines m signals $S_{ir}$ corresponding to $S_{prcan}$ to be precursor response signal set $S_{prres}$, and determines n signals $S_{ir}$ next in response speed to $S_{prres}$ to postcursor response signal set $S_{pores}$ (step S106).

When $S_w$ is less than any one of signals $S_{era}$ (step 303), maximum response value updating means 11 updates $S_{prcan}$ with m sequential signals $S_{ra}$, in which the lowest response speed one of the signals $S_{era}$ greater than $S_w$ is highest in response speed, and updates $S_{mra}$ with the maximum one of the results of updating of $S_{prcan}$ (step 304).

As an example, timing production in the case where the absolute impulse response values are as shown in FIG. 5 will now be considered. It is assumed that the number of the members in the precursor response signal set is m=2, the number of the members in the postcursor set is n=2 and the shift factor $\beta$ is $\beta$=0.5. Since $S_{ra}(4)$=0.6 is maximum, the maximum absolute response value signal $S_{mra}$ is $S_{mra}$=0.6.

The precursor signal candidate group $S_{prcan}$ is thus $$S_{prcan}=\{S_{ra}(4), S_{ra}(5)\}=\{0.6, 0.4\}.$$

The weighted signal $S_w$ is $$S_w=S_{mra}\times\beta=0.3,$$

and it is less than $S_{ra}(3)$ higher in response speed than the precursor candidate signal set $S_{prcan}$.

Thus, the precursor candidate signal set $S_{prcan}$ is updated to m sequential signals $S_{ra}$ higher in response speed by one each, that is, the updated precursor candidate signal set $S_{prcan}$ is $$S_{prcan}=\{S_{ra}(3), S_{ra}(4)\}=\{0.5, 0.6\},$$

and the maximum absolute response value signal $S_{mra}$ among these values is $$S_{mra}=0.6.$$

The weighted signal $S_w$ is $$S_w=S_{mra}\times=0.3$$

and is not changed.

At this time, the weighted signal $S_w$ is greater than all of the absolute response value signals $S_{ra}$ higher in response speed than the precursor candidate signal set $S_{prcan}$. Thus, the impulse response signals corresponding to the precursor candidate signal set $S_{prcan}$ is determined to be the precursor response signal set $S_{prres}$, and the two impulse response signals next in response speed to the precursor candidate signal set $S_{prcan}$ is determined to be the postcursor response signal set $S_{pores}$.

As has been described in the foregoing, according to the present invention it is possible to realize the timing recovery without need of division-including evaluation function computations.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A timing recovery circuit comprising:

absolute response value signal generating means for obtaining absolute values of L input impulse response value signals representing as communication channel characteristic and arranged in an order of shorter response times and providing the obtained absolute values as absolute response value signals;

absolute value signal sum generating means for using the maximum one of the absolute response value signals as a maximum absolute response value signal and using m sequential absolute response value signals, in which the maximum absolute response value signal is highest in response speed, as a precursor candidate signal set and providing the total sum of the precursor candidate signal set as an absolute value signal sum;

weighted absolute value signal sum generating means for multiplying the absolute value signal sum by a shift factor determined on the basis of a received signal intensity to obtain and provide a weighted absolute value signal sum;

precursor/postcursor response signal set generating means for providing, when the weighted signal sum is greater than all of preceding absolute response value signals wherein all of preceding absolute response value signals are higher in response speed than the precursor candidate signal set, m impulse response signals corresponding to the precursor candidate signal set among the L impulse response signals as a precursor response signal set and n impulse response signals next in response speed to the precursor response signal set as a postcursor response signal set; and weighted absolute value signal sum updating means for updating, when the weighted signal sum is less than any one of the preceding absolute value response signals, the precursor candidate signal set with m sequential absolute response value signals higher in response speed by one each and updating the weighted absolute value signal sum with weighted total sum of the updated precursor candidate signal set, the precursor and postcursor response signal sets being determined recursively, wherein L, m and n are natural numbers.

2. A timing recovery circuit comprising:

absolute response value signal generating means for obtaining absolute values of L input impulse response value signals representing as communication channel characteristic and arranged in an order of shorter response times and providing the obtained absolute values as absolute response value signals;

truncation error signal generating means for using the maximum one of the absolute response value signals as a maximum absolute response value signal and using m sequential absolute response value signals, in which the maximum absolute response value signal is highest in response speed, as a precursor candidate signal set, providing the total sum of the precursor candidate signal set as an absolute value signal sum and providing the total sum of all the absolute response value signals higher in response speed than the maximum absolute response value signal as a truncation error signal;

weighted absolute value signal sum generating means for multiplying the absolute value signal sum by a shift factor determined on the basis of a received signal intensity to obtain and provide a weighted absolute value signal sum;

precursor/postcursor response signal set generating means for providing, when the weighted signal sum is greater than the truncation error signal, m impulse response signals corresponding to the precursor candidate signal set among the L impulse response signals as a precursor response signal set and n impulse response signals next in response speed to the precursor response signal set as a postcursor response signal set; and truncation error signal updating means for updating, when the weighted signal sum is less than the truncation error signal, the precursor candidate signal set with m sequential absolute response value signals higher in response speed by one each, updating the weighted absolute value signal sum with weighted total sum of the updated precursor candidate signal set and updating the truncation error signal with the total sum of all the absolute response value signals higher in response speed than the updated precursor candidate signal set, the precursor and postcursor response signal sets being determined recursively, wherein L, m and n are natural numbers.

3. A timing recovery circuit comprising:

absolute response value signal generating means for obtaining absolute values of L input impulse response value signals representing as communication channel characteristic and arranged in an order of shorter response times and providing the obtained absolute values as absolute response value signals;

precursor candidate signal generating means for using the maximum one of the absolute response value signals as a maximum absolute response value signal and using m sequential absolute response value signals, in which the maximum absolute response value signal is highest in response speed, as a precursor candidate signal set;

weighted absolute value signal generating means for multiplying the maximum absolute response value signal by a shift factor determined on the basis of a received signal intensity to obtain and provide a weighted absolute value signal;

precursor/postcursor response value signal set generating means for providing, when the weighted signal is greater than all of preceding absolute response value signals wherein all of preceding absolute response value signals are higher in response speed than the precursor candidate signal set, m impulse response value signals corresponding to the precursor candidate signal set among the L impulse response signals as a precursor response signal set and n impulse response signals next in response speed to the precursor response signal set as a postcursor response signal set; and maximum response value signal updating means for updating, when the weighted signal is less than any one of the preceding absolute response value signals, the precursor candidate signal set with m sequential absolute response value signals, in which the lowest response speed one of the preceding absolute value response signals greater than the weighted absolute value signal is highest in response speed and updating the maximum response value signal with the maximum one of the updated precursor candidate signal set, the precursor and postcursor response signal sets being determined recursively, wherein L, m and n are natural numbers.

4. The timing recovery circuit according to claim 1, which further comprises shift factor determining means for selecting and determining the shift factor from a detected reception power level, of the received signal.

5. A timing recovery method comprising steps of:

obtaining absolute values of L input impulse response value signals representing as communication channel characteristic and arranged in an order of shorter response times and providing the obtained absolute values as absolute response value signals;

using the maximum one of the absolute response value signals as a maximum absolute response value signal and using m sequential absolute response value signals, in which the maximum absolute response value signal is highest in response speed, as a precursor candidate signal set and providing the total sum of the precursor candidate signal set as an absolute value signal sum;

multiplying the absolute value signal sum by a shift factor determined on the basis of a received signal intensity to obtain and provide a weighted absolute value signal sum;

providing, when the weighted signal sum is greater than all of preceding absolute response value signals wherein all of preceding absolute response value signals are higher in response speed than the precursor candidate signal set, m impulse response signals corresponding to the precursor candidate signal set among the L impulse response signals as a precursor response signal set and n impulse response signals next in response speed to the precursor response signal set as a postcursor response signal set; and updating, when the weighted signal sum is less than any one of the preceding absolute value response signals, the precursor candidate signal set with m sequential absolute response value signals higher in response speed by one each and updating the weighted absolute value signal sum with weighted total sum of the updated precursor candidate signal set, the precursor and postcursor response signal sets being determined recursively, wherein L, m and n are natural numbers.

6. A timing recovery method comprising steps of:

obtaining absolute values of L input impulse response value signals representing as communication channel characteristic and arranged in an order of shorter response times and providing the obtained absolute values as absolute response value signals;

using the maximum one of the absolute response value signals as a maximum absolute response value signal and using m sequential absolute response value signals, in which the maximum absolute response value signal is highest in response speed, as a precursor candidate signal set, providing the total sum of the precursor candidate signal set as an absolute value signal sum and providing the total sum of all the absolute response value signals higher in response speed than the maximum absolute response value signal as a truncation error signal;

multiplying the absolute value signal sum by a shift factor determined on the basis of a received signal intensity to obtain and provide a weighted absolute value signal sum;

providing, when the weighted absolute value signal sum is greater than the truncation error signal, m impulse response signals corresponding to the precursor candidate signal set among the L impulse response signals as a precursor response signal set and n impulse response signals next in response speed to the precursor response signal set as a postcursor response signal set; and updating, when the weighted signal sum is less than the truncation error signal, the precursor candidate signal set with m sequential absolute response value signals higher in response speed by one each, updating the weighted absolute value signal sum with weighted total sum of the updated precursor candidate signal set and updating the truncation error signal with the total sum of all the absolute response value signals higher in response speed than the updated precursor candidate signal set, the precursor and postcursor response signal sets being determined recursively, wherein L, m and n are natural numbers.

7. A timing recovery method comprising steps of:

obtaining absolute values of L input impulse response value signals representing as communication channel characteristic and arranged in an order of shorter response times and providing the obtained absolute values as absolute response value signals;

using the maximum one of the absolute response value signals as a maximum absolute response value signal and m sequential absolute response value signals, in which the maximum absolute response value signal is highest in response speed, as a precursor candidate signal set;

multiplying the maximum absolute response value signal by a shift factor determined on the basis of a received signal intensity to obtain and provide a weighted absolute value signal;

providing, when the weighted signal is greater than all of preceding absolute response value signals wherein all of preceding absolute response value signals are higher in response speed than the precursor candidate signal set, m impulse response value signals corresponding to the precursor candidate signal set among the L impulse response signals as a precursor response signal set and n impulse response signals next in response speed to the precursor response signal set as a postcursor response signal set; and updating, when the weighted signal is less than any one of the preceding absolute response value signals, the precursor candidate signal set with m sequential absolute response value signals, in which the lowest response speed one of the preceding absolute value response signals greater than the weighted absolute value signal is highest in response speed and updating the maximum response value signal with the maximum one of the updated precursor candidate signal set, the precursor and postcursor response signal sets being determined recursively, wherein L, m and n are natural numbers.

8. The timing recovery method according to claim 5, which further comprises step for selecting and determining the shift factor from a detected reception power level of the received signal.

9. The timing recovery circuit according to claim 2, which further comprises shift factor determining means for selecting and determining the shift factor from a detected reception power level of the received signal.

10. The timing recovery circuit according to claim 3, which further comprises shift factor determining means for selecting and determining the shift factor from a detected reception power level of the received signal.

11. The timing recovery method according to claim 6, which further comprises step for selecting and determining the shift factor from a detected reception power level of the received signal.

12. The timing recovery method according to claim 7, which further comprises step for selecting and determining the shift factor from a detected reception power level of the received signal.

\* \* \* \* \*